United States Patent
Hirth

[15] 3,694,064
[45] Sept. 26, 1972

[54] FRAMING ADJUSTER FOR SINGLE FRAME FILMSTRIP PROJECTOR

[72] Inventor: William R. Hirth, Warminster, Pa.
[73] Assignee: Optisonics Corporation, Montgomeryville, Pa.
[22] Filed: Aug. 23, 1971
[21] Appl. No.: 173,949

[52] U.S. Cl. .................................. 352/163, 226/76
[51] Int. Cl. ............................................ G03b 21/46
[58] Field of Search ............. 352/163, 164, 160, 161; 226/64, 52, 76

[56] References Cited

UNITED STATES PATENTS

| | | | |
|---|---|---|---|
| 1,521,785 | 1/1925 | Morton | 352/163 |
| 2,257,197 | 9/1941 | Serrurier | 352/163 X |
| 3,003,393 | 10/1961 | Kilday | 352/163 X |
| 3,419,119 | 12/1968 | Prelletz | 352/163 X |
| 3,152,741 | 10/1964 | Jorgensen | 226/70 X |
| 3,552,843 | 1/1971 | Kaess | 226/64 X |

Primary Examiner—Samuel S. Matthews
Assistant Examiner—Monroe H. Hayes
Attorney—D. R. Pressman

[57] ABSTRACT

An indexing or framing adjuster for a shuttlerless projector of the type which projects the frames of filmstrip sequentially and non-continuously onto a viewing screen, usually in synchronism with an audio presentation. The filmstrip is advanced by means of a motor mechanism which rotates a pair of sprocket wheels in engagement with the filmstrip a fixed angular increment each time the mechanism is actuated. The entire motor mechanism is pivotably mounted on an axis coincident with the mechanism's output shaft (the shaft which drives the sprocket wheels) such that rotation of the motor mechanism adjusts the position of the filmstrip. This enables the projected frame thereof to be symmetrically positioned (centered) on the viewing screen, whereby subsequently projected frames also will be properly centered. Rotation of the mechanism is accomplished by linearly adjusting a knob on the outside of the projector. The shaft of the knob extends through an elongated aperture in the housing of the projector into threaded engagement with one end of an arm, and other end of which is pivotably connected to the motor mechanism at a point spaced from its axis of rotation.

3 Claims, 2 Drawing Figures

PATENTED SEP 26 1972

3,694,064

INVENTOR
WILLIAM R. HIRTH

D.R. Pressman
ATTORNEY

FRAMING ADJUSTER FOR SINGLE FRAME FILMSTRIP PROJECTOR

CROSS REFERENCES TO RELATED APPLICATIONS

The present invention is used in the projector earlier disclosed in U.S. Pat. No. 3,252,372, granted May 24, 1966, to H. Gallina and preferably incorporates the film drive mechanism of U.S. Pat. No. 3,552,234, granted Jan. 5, 1971, also to H. Gallina. Further details of said projector and subsequent changes and improvements made thereto are disclosed in U.S. patent applications Ser. Nos. 25,707, 25,805, 31,071, and 31,072 of D. A. Youngblood, effectively filed Mar. 17, 1966.

BACKGROUND OF THE INVENTION

The present invention is designed for use in a shutterless projector of the type which can project the frames of a filmstrip in non-continuous sequence. Such a projector is most useful as a sales or tutorial aid and usually contains a separate audio recording playback mechanism with means for causing the filmstrip to sequence in synchronism with the audio playback. The particular improvement of this invention comprises an improved framing adjuster or centering mechanism for such a projector; adjustment of the mechanism causes the projected frames of said filmstrip to be symmetrically positioned on the viewing screen.

Heretofore one known framing adjuster comprises a friction-held knob for rotating the filmstrip-drive motor mechanism, whereby adjustments of said knob effected positional adjustments of the filmstrip frame being projected with respect to the viewing screen. This adjuster has several disadvantages: (1) the knob, which is held in position by a friction bearing, is relatively difficult to turn and hence it is relatively difficult to center the projected frame accurately, (2) since the knob's position is maintained by a friction bearing only, operation or movement of the projector may change the framing adjustment (due to inertia), rendering frequent readjustment necessary, (3) the friction bearing is relatively expensive, requiring several special components and a deep draw stamping in the side of the projector housing.

Accordingly several objects of the present invention are to overcome the foregoing disadvantages. Other objects are to provide a new and improved framing adjuster and to provide a framing adjuster which is easier to operate, less expensive to produce, and which is positively lockable in any position selected. Further objects and advantages will become apparent from a consideration of the ensuing description.

DRAWING

DESCRIPTION OF THE PREFERRED EMBODIMENT

The framing adjuster of the present invention is designed to be incorporated in a projector in which the frames of a filmstrip are sequentially projected in non-continuous sequence. The mechanism permits adjustment of the filmstrip with respect to the viewing screen (which preferably is self-contained) such that the currently projected frame and also subsequently projected frames will be properly centered on the viewing screen. For the sake of brevity and to facilitate understanding, only the components relevant to the present invention are disclosed; for a complete description of the projector, including its physical and electronic components, reference should be made to the issued and pending patents listed above.

Figure 1:
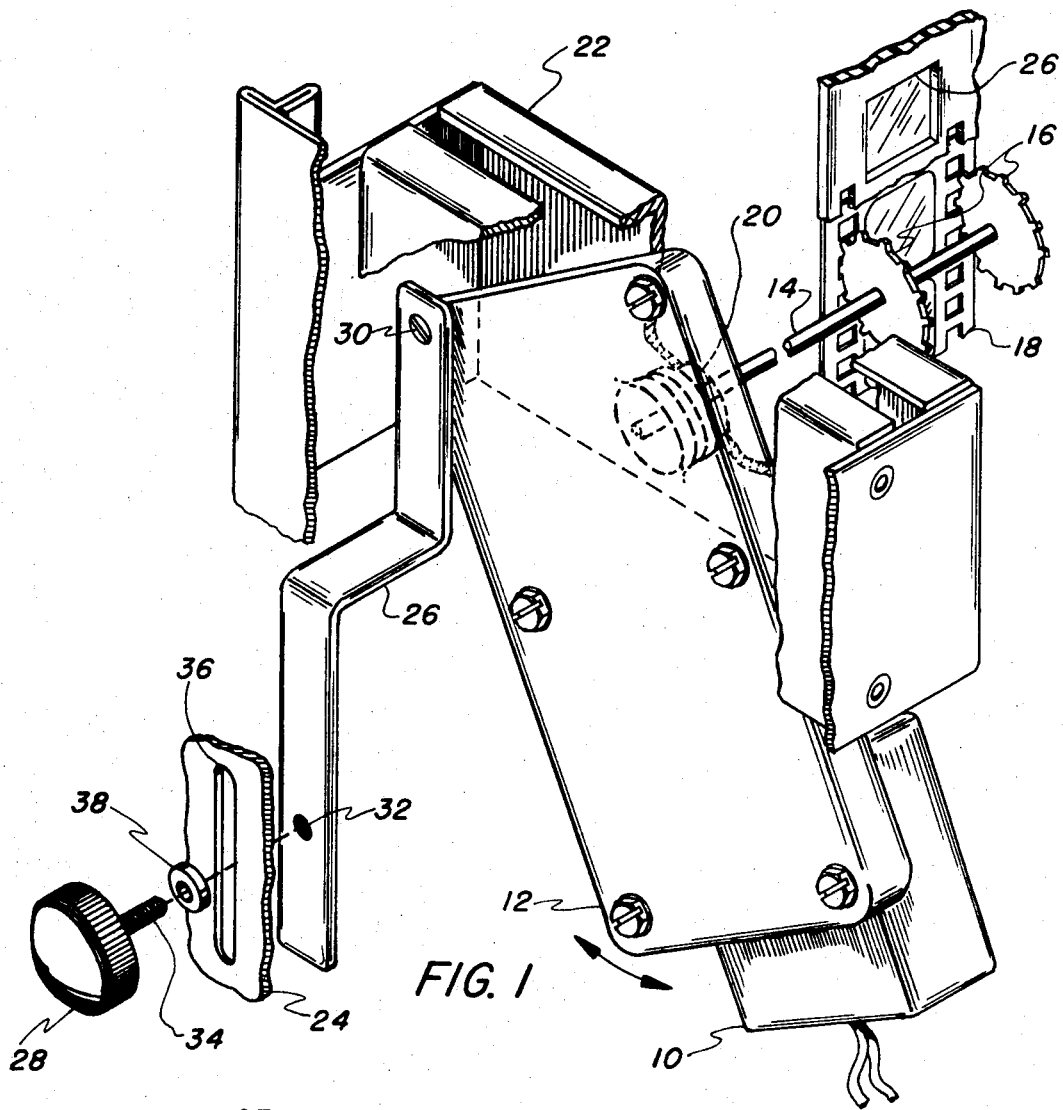
FIG. 1 is a diagram of the framing adjustment mechanism of the present invention.
Figure 2:
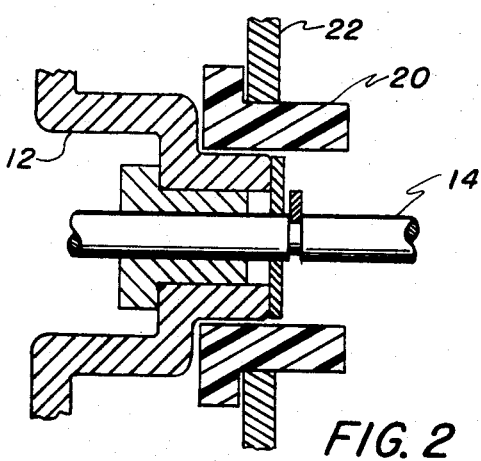
FIG. 2 is a detailed sectional view of the concentric bearings used in said mechanism.

The mechanism comprises a motor 10 (FIG. 1) which in practice is energized each time the filmstrip is to be advanced, preferably in response to recorded control bursts on the control track of an audio tape which contains a parallel, audio track on which is recorded a presentation related to the images on filmstrip 18. Motor 10 is connected to drive a geneva type frame advance mechanism 12. Each time motor 10 imparts rotary motion to mechanism 12, the output shaft 14 (shown in detail in FIG. 2) of mechanism 12 will rotate a fixed increment, sufficient to cause the sprocket wheels 16 mounted on shaft 12 to advance filmstrip 18 a distance equal to the spacing between adjacent frames. Thus each time motor 10 is energized, filmstrip 18 will advance from one frame to the next frame such that a new image will be projected.

The entire mechanism 12 (and motor 10, which is rigidly attached thereto) is pivotably mounted by means of a bearing 20 (shown in detail in FIG 2) on a structural member 22, which in turn is rigidly mounted to the projector housing. A portion of the projector housing is shown at 24. Since mechanism 12 includes internal gearing which non-rotatably couples shaft 14 to mechanism 12 at all times except during operation of mechanism 12, rotation of mechanism 12 about bearing 20 will cause shaft 14, and hence sprocket wheels 16 to rotate, thereby to adjust the position of filmstrip 18 with respect to a framing aperture 26. Thus if the frame of the filmstrip being projected is not centered on the viewing screen (not shown), rotation of mechanism 12 will adjust the position of the currently projected frame on the viewing screen so that the projected frame can be properly centered. Subsequently projected frames also will be properly centered since mechanism 12 will advance the filmstrip the precise distance equal to the frame spacing each time motor 10 is energized.

In order to adjust and lock the position of mechanism 12 in any rotational orientation within its range, an arm 26 and a knob 28 are provided. Arm 26 has two spaced, oppositely-directed orthogonal bends which provide arm 26 with the step-shaped configuration shown. The upper end of arm 26 is pivotally connected by a screw 30 to a point on mechanism 12 which is spaced from bearing 20. The opposite end of arm 26 contains a threaded aperture 22 into which the shaft 34 of knob 28 is threadedly engaged. Shaft 34 extends through an elongated aperture 36 in the projector housing and a washer 38 is provided between the projector housing 24 and knob 28. When knob 28 is tightened, the lower end of arm 32 will be drawn against wall 24 of the projector housing; conversely when knob 28 is loosened, the lower end of arm 32 will be pushed away from or free of wall 24.

OPERATION

Assume that a filmstrip 18 is being projected via aperture 26, but the projected image is not properly centered on the viewing screen. In order to adjust the position of the projected frame with respect to the framing aperture 26 and hence the viewing screen, knob 28 is rotated to release the lower end of arm 26 from wall 24 so that knob 28 can be moved along aperture 36. Vertical movements of the lower end of arm 26 are coupled by screw 30 to mechanism 12, causing mechanism 12 to pivot about bearing 20. When mechanism 12 rotates, its output shaft 14 and hence the sprocket wheels 16 will rotate, adjusting the position of the filmstrip. Upward movement of knob 28 causes mechanism 12 to rotate clockwise, thereby to raise the currently projected frame of filmstrip 18, and downward movement of knob 28 causes mechanism 12 to rotate counterclockwise, thereby to lower the projected frame of filmstrip 18.

When the filmstrip is correctly centered on the viewing screen, knob 28 is retightened, thereby to draw the lower portion of arm 26 against wall 24. This locks arm 26 and mechanism 12 in position. Now mechanism 12 is no longer able to rotate on bearing 20 and the correct centering of the filmstrip with respect to the framing aperture will not be lost despite inertial shocks due to operation or movement of the projector.

In comparison to prior art framing mechanisms, such as described above, the present mechanism is extremely simple and economical, requiring only three parts (arm 26, washer 36, and knob 28) and a simple stamping operation to form an elongated hole 36 in the projector housing. It has been found that framing adjustments with the mechanism described are extremely easy to make, lock, and change, if necessary.

Although the above description contains many specificities, these are not intended to limit the scope of the invention, but merely to exemplify one preferred embodiment thereof. The true scope of the invention is intended to be indicated by the subject matter of the appended claims and their legal equivalents.

I claim:
1. A framing adjuster comprising:
a projector having a filmstrip mounted therein adjacent a framing aperture,
a motor mechanism having an output shaft coupled to said filmstrip, said mechanism being arranged to advance said filmstrip a fixed increment each time said mechanism is actuated, said motor mechanism being pivotably mounted inside said projector on an axis coincident with said output shaft,
said adjuster being characterized in that one end of an elongated member is pivotably connected to said motor mechanism at a point spaced from said axis, said member being oriented in a direction generally perpendicular to said axis,
a knob being positioned outside said projector, said knob having a shaft extending through an elongated aperture in said projector housing, said elongated aperture lying in a plane perpendicular to said axis, said shaft being connected to another end of said elongated member, whereby linear movement of said knob along said elongated aperture will adjust the position of said filmstrip with respect to said framing aperture.

2. The invention of claim 1 further including means for locking said knob in any position along said elongated aperture.

3. The invention of claim 2 wherein said means comprises mating threading on the shaft of said knob and said other end of said elongated member, whereby rotation of said knob will draw said elongated member against said projector housing, thereby to lock said elongated member in position.

* * * * *